J. R. Marshall,

Animal Stock.

No. 100,170.   Patented Feb. 22, 1870.

Witnesses:
Victor Hagmann
John C. Kenon

Inventor
J. R. Marshall
per _____
Attorneys.

United States Patent Office.

JOSEPH R. MARSHALL, OF MARION, PENNSYLVANIA.

Letters Patent No. 100,170, dated February 22, 1870.

IMPROVEMENT IN SHEEP-SHEARING TABLE.

The Schedule referred to in these Letters Patent and making part of the same.

*To all whom it may concern:*

Be it known that I, JOSEPH R. MARSHALL, of Marion, in the county of Butler, and State of Pennsylvania, have invented a new and improved Sheep-Shearing Table; and I do hereby declare that the following is a full, clear, and exact description of the construction and operation of the same, reference being had to the accompanying drawings making a part of this specification, in which—

Figure 1:
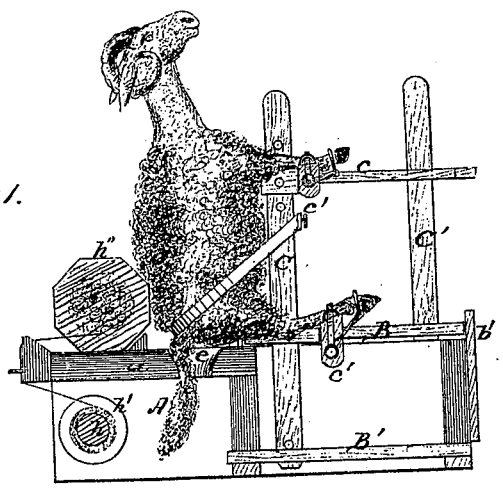
Figure 1 is a longitudinal vertical section showing the sheep sitting up.
Figure 2:
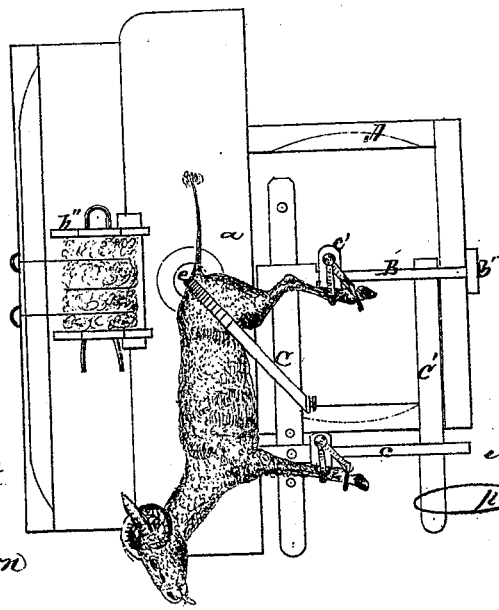
Figure 2 is a plan view, showing the sheep turned down on its side.

This invention has for its object to securely hold sheep during the process of shearing.

The invention consists of a pivoted frame, provided with stocks for confining the sheep's legs and a strap for sustaining its weight, and capable of holding the sheep in an upright position on its posterior, or in a recumbent posture on its side, and connected with a folding and cording apparatus for bundling the fleece.

In the drawings—

A is a box or frame, to the top of which is fastened a shelf, $a$, covering about half the box.

B is a bar set in bearings $b'$ $b'$ at its ends, transversely of the uncovered part of the box, and about at the middle thereof.

B' is a bar fixed in the box beneath the rotating bar B and parallel therewith.

A sliding post, C, is placed in mortises in the bars B B', at right angles therewith, and near the shelf $a$.

A second post, C', is stepped in the bar B near its opposite end, and parallel with the post C.

A sliding cross-bar, $c$, connects the two posts C C'.

On the cross-bars $c$ and B are stocks $c'$ $c'$, for confining the animal's legs in any suitable manner.

While shearing the head and upper parts of the body, the sheep is held upright on its posterior by the stocks and frame.

A strap, $c''$, passed under the sheep and buttoned at its ends to the post C sustains the animal's weight.

When it becomes necessary to turn the sheep down upon its side, in order to shear its rear parts, it is only necessary to raise the post C out of the lower cross-bar B', when the frame may be readily turned down on the bar B as a pivot.

A hole, $e$, is cut through the shelf $a$, immediately beneath the animal, for its excretions to pass through, so that the operators may avoid besmearing.

Two reels, $h$ $h$, are placed on a shaft, $h'$, beneath the shelf $a$, on which are wound cords, which are laid parallel across the shelf, one at each side of the sheep.

A wool-keeper, $h''$, of bent wire is laid on the cords on which wool-keepers the fleece is wound by hand, as it is taken from the animal. When the keeper is full, the cords are tied around the fleece, the keeper is withdrawn, and the fleece is ready for transportation.

Having thus described my invention,

What I claim as new, and desire to secure by Letters Patent, is—

1. The pivoted frame B C C' $c$, the stocks $c'$, and box A, combined and arranged substantially as and for the purpose set forth.

2. The box A, shelf, $a$, reels $h$, and keeper $h''$, all combined and arranged substantially as and for the purpose explained.

3. The box A, shelf $a$, pivoted frame B C C' $c$, and stocks, all combined and arranged substantially in the manner described.

JOSEPH R. MARSHALL.

Witnesses:
WM. FLEMING,
A. M. BARBER.